United States Patent
Sanketi et al.

(10) Patent No.: US 11,403,540 B2
(45) Date of Patent: Aug. 2, 2022

(54) ON-DEVICE MACHINE LEARNING PLATFORM

(71) Applicant: Google Inc., Mountain View, CA (US)

(72) Inventors: Pannag Sanketi, Fremont, CA (US); Wolfgang Grieskamp, Sammamish, WA (US); Daniel Ramage, Seattle, WA (US); Hrishikesh Aradhye, Santa Clara, CA (US)

(73) Assignee: GOOGLE LLC, Mountain View, CA (US)

(*) Notice: Subject to any disclaimer, the term of this patent is extended or adjusted under 35 U.S.C. 154(b) by 961 days.

(21) Appl. No.: 15/674,885

(22) Filed: Aug. 11, 2017

(65) Prior Publication Data

US 2019/0050746 A1 Feb. 14, 2019

(51) Int. Cl.
*G06N 5/04* (2006.01)
*G06N 20/00* (2019.01)

(52) U.S. Cl.
CPC ............ *G06N 5/048* (2013.01); *G06N 20/00* (2019.01)

(58) Field of Classification Search
CPC ..... G06N 20/00; G06N 5/04; H04M 1/72563; G06F 12/14; G06F 21/12
See application file for complete search history.

(56) References Cited

U.S. PATENT DOCUMENTS

| 8,429,103 | B1 | 4/2013 | Aradhye et al. | |
| 8,606,728 | B1 | 12/2013 | Lin et al. | |
| 8,613,055 | B1 * | 12/2013 | Tomilson | G06F 21/00 |
| | | | | 713/182 |
| 9,336,494 | B1 | 5/2016 | Purpura et al. | |
| 2005/0234753 | A1 | 10/2005 | Pinto et al. | |
| 2009/0106178 | A1 | 4/2009 | Chu | |
| 2013/0275391 | A1 * | 10/2013 | Batwara | G06F 16/125 |
| | | | | 707/689 |
| 2014/0095493 | A1 | 4/2014 | Feuersänger et al. | |

(Continued)

FOREIGN PATENT DOCUMENTS

| JP | 2016525983 | 12/2016 |
| WO | WO 2015/022838 | 2/2015 |

OTHER PUBLICATIONS

McMahan et al., "Federated Learning of Deep Networks using Model Averaging," arXiv:1602.05629v1 [cs.LG] Feb. 17, 2016. (Year: 2016).*

(Continued)

*Primary Examiner* — Miranda M Huang
*Assistant Examiner* — Yao David Huang
(74) *Attorney, Agent, or Firm* — Dority & Manning, P.A.

(57) ABSTRACT

The present disclosure provides systems and methods for on-device machine learning. In particular, the present disclosure is directed to an on-device machine learning platform and associated techniques that enable on-device prediction, training, example collection, and/or other machine learning tasks or functionality. The on-device machine learning platform can include a context provider that securely injects context features into collected training examples and/or client-provided input data used to generate predictions/inferences. Thus, the on-device machine learning platform can enable centralized training example collection, model training, and usage of machine-learned models as a service to applications or other clients.

20 Claims, 9 Drawing Sheets

(56) References Cited

U.S. PATENT DOCUMENTS

| | | | |
|---|---|---|---|
| 2014/0189246 A1* | 7/2014 | Xing | G06F 21/53 |
| | | | 711/135 |
| 2014/0358825 A1 | 12/2014 | Phillipps et al. | |
| 2015/0127590 A1 | 8/2015 | Gay et al. | |
| 2016/0191534 A1* | 6/2016 | Mallozzi | G06F 21/629 |
| | | | 726/4 |
| 2016/0366120 A1* | 12/2016 | Rykowski | H04W 12/0609 |
| 2017/0004454 A1 | 1/2017 | Tang et al. | |
| 2017/0091651 A1 | 3/2017 | Miao et al. | |
| 2017/0124487 A1 | 5/2017 | Szeto et al. | |
| 2017/0213131 A1 | 7/2017 | Hammond et al. | |
| 2018/0025287 A1* | 1/2018 | Mathew | G06N 5/04 |
| | | | 706/12 |
| 2018/0032915 A1* | 2/2018 | Nagaraju | G06V 10/94 |
| 2018/0034715 A1* | 2/2018 | Nagaraju | G06F 16/2477 |
| 2018/0210768 A1* | 7/2018 | Dai | G06F 9/547 |
| 2018/0241572 A1* | 8/2018 | Miele | H04L 9/0643 |
| 2019/0005229 A1* | 1/2019 | Hlaing | H04L 9/0894 |

OTHER PUBLICATIONS

McMahan et al., "Communication-Efficient Learning of Deep Networks from Decentralized Data," arXiv:1602.05629v3 [cs.LG] Feb. 28, 2017 (Year: 2017).*

Abadi et al., "TensorFlow: Large-Scale Machine Learning on Heterogeneous Distributed Systems,"arXiv:1603.04467v2 [cs.DC] Mar. 16, 2016 (Year: 2016).*

A. Sankaran et al., "DARVIZ: Deep Abstract Representation, Visualization, and Verification of Deep Learning Models," 2017 IEEE/ACM 39th International Conference on Software Engineering: New Ideas and Emerging Technologies Results Track (ICSE-NIER), 2017, pp. 47-50. (Year: 2017).*

International Search Report and Written Opinion for PCTUS2018029563 dated Aug. 13, 2018, pp. 1-5.

Bachrens et al., "How to Explain Individual Classification Decisions", The Journal of Machine Learning Research, vol. 11, Mar. 1, 2010, pp. 1803-1831.

Cohen, "Learning the Learner: The Ultimate Way to Monitor Machine Learning", Jun. 1, 2016, http://www.anodot.com/?s=learing+the+leanrer+the+ultimate+way+to+monitor+machinelearning, retrieved on Sep. 19, 2017, 7 pages.

Groce et al., "You Are the Only Possible Oracle: Effective Test Selection for End Osers of Interactive Machine Learning Systems", Institute of Electrical and Electronics Engineers Transactions on Software Engineering, vol. 40, Issue 3, Mar. 2014, 20 pages.

Herlocker et al., "Explaining Collaborative Filtering Recommendations", Proceedings of the 2000 Association for Computing Machinery Conference on Computer Supported Cooperative Work, Dec. 2-6, 2000, Philadelphia, Pennsylvania, 10 pages.

Ribeiro el al., "Why Should I Trust You? Explaining the Predictions of Any Classifier", In Association for Computing Machinery's Special Interest Group on Knowledge Discovery and Data Mining, Aug. 13-17, 2016, San Francisco, California, 10 pages.

Vartak el al, "ModelDB: A Sysiem for Machine Learning Model Management", Workshop on Human-In-the-Loop Data Analytics. Jun. 26-Jul. 1, 2016, San Francisco, California, 3 pages.

* cited by examiner

ON-DEVICE MACHINE LEARNING PLATFORM

FIELD

The present disclosure relates generally to machine learning. More particularly, the present disclosure relates to an on-device machine learning platform and associated techniques that enable on-device prediction, training, example collection, and/or other machine learning tasks or functionality.

BACKGROUND

In recent years, machine learning has been increasingly used to provide improved services to users of computing devices. In particular, many applications or other computing programs or systems rely on one or more machine-learned models to produce inferences based on input data associated with the program, device, and/or user. The application(s) can use the inference(s) to perform or influence any type of task or service.

One conventional training scheme for solving machine learning problems includes collecting at a centralized location (e.g. a server device) a plurality of training examples from a plurality of computing devices (e.g., user devices such as smartphones). A machine-learned model can then be trained at the centralized location based on the collected training examples.

In addition, in some instances, the trained model can be stored at the centralized location. In order to receive an inference from the model, the user computing device is required to transmit input data to the server computing device over the network, wait for the server device to implement the machine-learned model to produce inference(s) based on the transmitted data, and then receive the inference(s) from the server computing device again over the network.

In such scenarios, the training example(s) and/or inference(s) are required to be transmitted between the user computing device and the server computing device over a network. Such network transmission represents a data security risk as the data transmitted over the network may be susceptible to interception. In addition, such network transmission increases network traffic which can result in reduced communication speeds. Further, latency associated with transmitting the data back and forth over the network can cause delay in providing the application's services.

More recently, certain applications have included machine-learned models that are stored within the application and implemented by the application on the user device. However, this architecture is both challenging to implement and resource intensive. For example, in such scenario, the application is required to store, manage, train, and/or implement one or more machine-learned models. Inclusion of the model and corresponding support services within the application itself can increase the data size of the application, resulting in a larger memory footprint.

Machine learning within the application can also require more frequent application updates. For example, the application may need to be updated as the underlying machine learning engine is updated or otherwise advances. Application updates can undesirably require network usage and downtime for the user as the update is downloaded and installed.

Furthermore, machine learning within the application can also complicate application development, as additional services need to be built into the application itself. Thus, developers may be required to learn and stay abreast of the intricacies of different machine learning engines.

SUMMARY

Aspects and advantages of embodiments of the present disclosure will be set forth in part in the following description, or can be learned from the description, or can be learned through practice of the embodiments.

One example aspect of the present disclosure is directed to a computing device. The computing device includes one or more processors and one or more non-transitory computer-readable media. The one or more non-transitory computer-readable media store one or more applications implemented by the one or more processors; one or more machine-learned models; and instructions that, when executed by the one or more processors, cause the computing device to implement an on-device machine learning platform that performs operations. The operations include receiving input data from a first application of the one or more applications via a prediction application programming interface. The operations include employing at least a first machine-learned model of the one or more machine-learned models to generate at least one inference based at least in part on the input data. The operations include providing the at least one inference generated by the first machine-learned model to the first application via the prediction application programming interface.

Another example aspect of the present disclosure is directed to one or more non-transitory computer-readable media that collectively store instructions that, when executed by one or more processors, cause a computing device to implement an on-device machine learning platform that performs operations. The operations include receiving input data from a first application of one or more applications stored on the computing device via a prediction application programming interface. The operations include employing at least a first machine-learned model of one or more machine-learned models stored on the computing device to generate at least one inference based at least in part on the input data. The operations include providing the at least one inference generated by the first machine-learned model to the first application via the prediction application programming interface.

Another example aspect of the present disclosure is directed to a computer-implemented method. The method includes receiving, by a computing device via a collection application programming interface, a new training example from a first application of a plurality of applications stored on the computing device. The method includes storing, by the computing device, the new training example in a centralized example database of the computing device. The method includes receiving, by the computing device, an instruction from the first application via a training application programming interface to re-train a first machine-learned model stored by the computing device based at least in part on one or more of the training examples stored by the centralized example database. The method includes, in response to the instruction, causing, by the computing device, the first machine-learned model to be re-trained based at least in part on one or more of the training examples stored by the centralized example database. The method includes receiving, by the computing device, input data from the first application via a prediction application programming interface. The method includes employing the first machine-learned model to generate at least one inference based at least in part on the input data. The method includes providing the at least one inference generated by the first machine-learned model to the first application via the prediction application programming interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
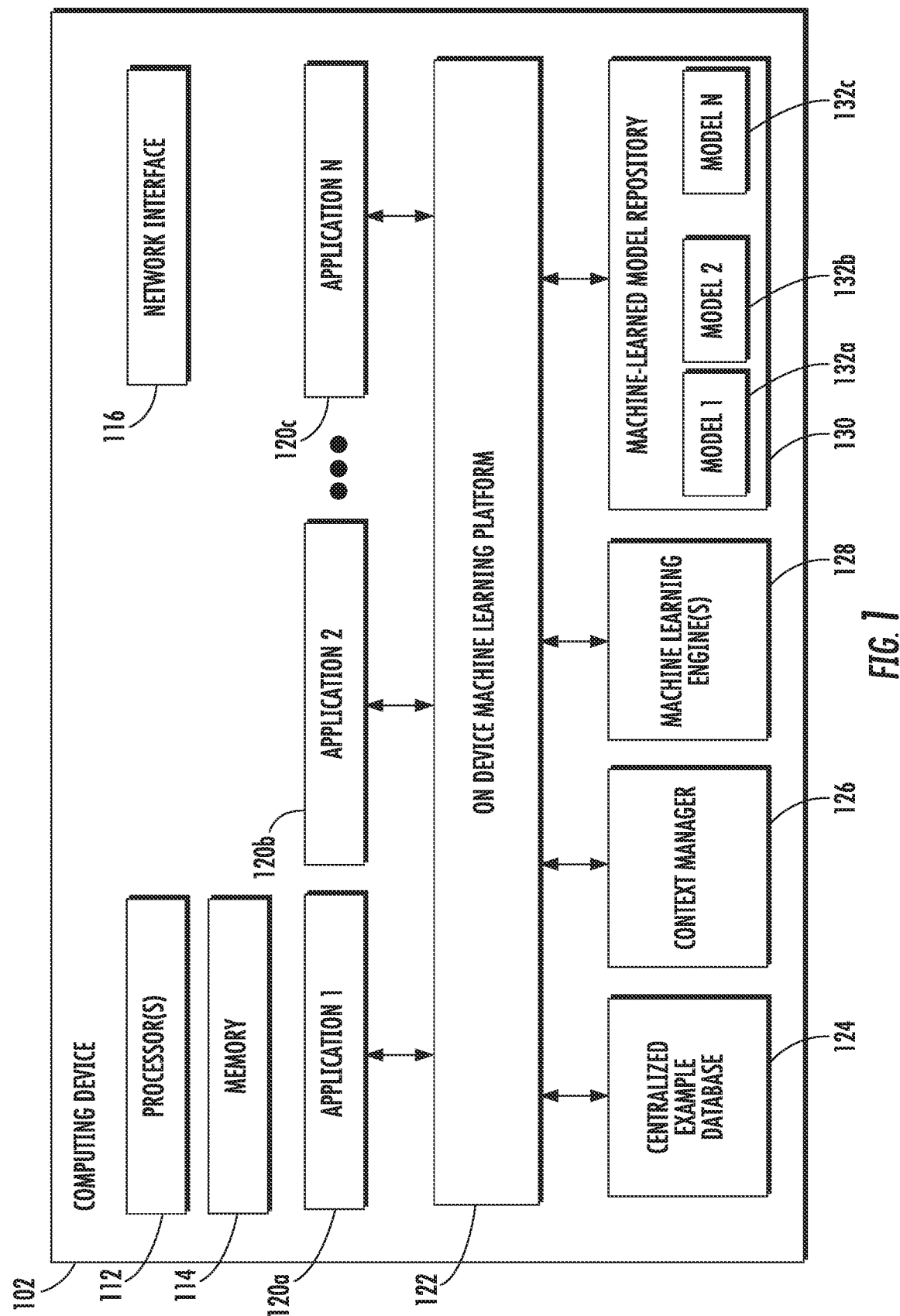
FIG. 1 depicts a block diagram of an example computing system that includes an on-device machine learning platform according to example embodiments of the present disclosure.

Generally, the present disclosure is directed to systems and methods for on-device machine learning. In particular, the present disclosure is directed to an on-device machine learning platform and associated techniques that enable on-device prediction, training, example collection, and/or other machine learning tasks or functionality, which may be collectively referred to as "machine learning functions".

The on-device machine learning platform may be in the form of one or more computer programs stored locally on a computing device or terminal (e.g., a smartphone or tablet), which are configured, when executed by the user device or terminal, to perform machine learning management operations which enable performance of on-device machine learning functions on behalf of one or more locally-stored applications, routines, or other local clients. At least some of the on-device machine learning functions may be performed using one or more machine learning engines implemented locally on the computing device or terminal. Performance of the on-device machine learning functions on behalf of the one or more locally-stored applications or routines (which may be referred to as "clients") may be provided as a centralized service to those clients, which may interact with the on-device machine learning platform via one or more application programming interfaces (APIs).

In addition, in some implementations, the on-device machine learning platform can include a context provider that securely injects context features into collected training examples and/or client-provided input data used to generate predictions/inferences. Thus, the on-device machine learning platform can enable centralized training example collection, model training, and usage of machine-learned models as a service to applications or other clients.

More particularly, a computing device such as, for example, a mobile computing device (e.g., smartphone) can store or otherwise include one or more applications (e.g., mobile applications). The computing device can also include and implement the on-device machine learning platform and one or more machine-learned models. For example, the machine-learned models can be stored by the device in a centralized model layer managed by the platform.

According to one aspect of the present disclosure, the applications can communicate with the on-device machine learning platform via an API (which may be referred to as the "prediction API") to provide input data and obtain predictions based on the input data from one or more of the machine-learned models. As an example, in some implementations, given a uniform resource identifier (URI) for a prediction plan (e.g., instructions for running the model to obtain inferences/predictions) and model parameters, the on-device machine learning platform can download the URI content (e.g., prediction plan and parameters) and obtain one or more inferences/predictions by running the model (e.g., by interacting with a machine learning engine to cause implementation of the model by the engine). In addition, the platform can cache the content so that it can be used for subsequent prediction requests.

Thus, on-device machine-learned models can be accessed by an application by communicating with the on-device machine learning platform via a client/service relationship. In particular, in some implementations, the machine-learning platform can be a standalone multi-tenant service which can be referenced by applications. As such, a given application is not required to store, manage, train, and/or implement machine-learned model(s) but can instead simply communicate with the on-device machine learning platform to request and receive inferences from the model(s).

According to another aspect of the present disclosure, the computing device can further include a centralized example database that stores training examples received from the one or more applications. In particular, the on-device machine learning platform can receive training examples from the applications via an API (which may be referred to as the "collection API") and can manage storage of the examples in the centralized example database. For example, each application that is a client or tenant of the platform can have its own collection(s) of examples stored within the centralized example database and the collection(s) can be supplemented and/or managed in an online fashion.

In some implementations, the on-device machine learning platform can cause storage of each training example received from an application (e.g., within its corresponding collection) according to one or more options parameters associated with the application providing the training example. As one example, the options parameters can include a time-to-live parameter that defines a period of time for which training examples are stored (e.g., and are thereafter deleted). In some implementations, the options parameters can be predefined and/or adjusted through instructions provided to the platform via the collection API.

According to another aspect of the present disclosure, in some implementations, the on-device machine learning platform can securely inject context features descriptive of a context associated with the computing device into the training examples. For example, upon receiving a training example from an application, a context provider component of the on-device platform can determine one or more context features and can store such context features together with the training example in the centralized example database. For example, the context features and the data provided in the new training example can be stored as a single database entry. The particular context features that are determined and then injected or otherwise associated and/or stored with a training example received from a particular application can be specified by the options parameters for such particular application. As described above, these options features can be adjusted or predefined via the collection API. Thus, an application can control (e.g., via defining the options parameters) which context features or context types are injected into its training examples.

In some implementations, context features are injected on the service side, such that the context features never need to become directly available to applications. In particular, in some implementations, the centralized example database is not directly accessible by the one or more applications, such that the context information stored with a particular training example is not accessible even to the application that provided the training example.

In some implementations, the context features can be grouped or otherwise categorized according to a number of different context types. In general, each context type can specify or include a set of context features with well-known names and well-known types. One example context type is device information which includes the following example context features: audio state, network state, power connection, etc.

In some implementations, the context provider requests the value that is injected for a given context feature from the device (e.g., from a context manager of the device) at the time/point of injection. Alternatively or additionally, the context provider can register as a listener to one or more context updates and can maintain a context feature cache of current values for the context features based on the one or more context updates. Then, when context features are injected, the context provider can simply access the context feature cache and inject the current value maintained in the cache for the particular context feature.

In addition or alternatively to injection of context features to training examples at storage time, the context provider can also perform injection of context features at inference time. In particular, similar to the above described process for training example collection, when a particular application or other client requests (e.g., via the prediction API) for an inference to be generated on the basis of some client-provided input data, the context provider can inject or provide supplemental context features for input into the corresponding machine-learned model alongside the input data. Thus, inferences can be made based at least in part on context information in addition to the client-provided input data, which may assist in improving the accuracy of the inferences.

Further to the descriptions above, a user may be provided with controls allowing the user to make an election as to both if and when systems, programs or features described herein may enable collection of user information (e.g., training examples and context features), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

According to another aspect, since certain applications or other clients may have permission to access only certain of the context features or context types (e.g., as defined or controlled by a device user), the context provider can perform client permission control. In particular, in some implementations, the on-device machine learning platform or other device component can maintain a mapping of which clients have permission to access which context types. When context features are to be injected (e.g., either into a training example for storage or to supplement client-provided input data at inference time), the context provider can check the permission status of the corresponding application or other client relative to the context features or context types to be injected. For example, the permission status for a particular application and a context type can describe whether such application has permission to access such context type. The context provider will inject only context features that are included in context types that the application has permission to access, thereby preventing an application from accessing (even in a second-hand fashion) context features/types to which it does not have permission to access.

Similar to the time-to-live options parameter described above, in some implementations, each context feature can have an expiration period associated therewith or assigned thereto. This expiration period information can be associated with each training example that contains context feature(s). In some implementations, at the conclusion of the expiration period for a particular context feature provided in a particular training example, the value for such context feature can be deleted or otherwise removed from such training example. Alternatively, the entire training example can be deleted or otherwise removed.

Furthermore, in some implementations, in response to a change to a permission status for a particular application or other client relative to a particular context feature or context type, the on-device platform can delete from the centralized example database any values or entries for such context feature(s) or type(s) that are associated with training examples associated with the particular application. In addition, in some implementations, the corresponding model(s) can be re-trained on the remaining data after deletion of the context feature value(s).

According to yet another aspect of the present disclosure, the applications can communicate with the on-device machine learning platform via an API (which may be referred to as the "training API") to cause re-training or updating of a machine-learned model based on training examples stored in the centralized example database. As an example, in some implementations, given a URI for a training plan (e.g., instructions for training the model), the on-device machine learning platform can run training of the model (e.g., by interacting with a machine learning engine to cause training of the model by the engine) based on previously collected examples. For example, the training can be performed in the background at scheduled times and/or when the device is idle.

After retraining of the model, the re-trained model can be used to provide inferences as described elsewhere herein. Typically, these inferences will have higher accuracy since the model has been re-trained on data that is specific to the user. Thus, the on-device machine learning platform can enable centralized example data collection and corresponding personalization of machine-learned models as a service to applications or other clients.

According to another aspect, in some implementations, the machine learning platform can upload logs or other updates regarding the machine-learned models to the cloud for detailed analytics of machine learning metrics. As an example, in some implementations, the on-device platform can determine an update that describes the parameters of a re-trained machine-learned model or changes to the parameters of the machine-learned model that occurred during the re-training of model. The platform can transmit the update to a central server computing device (e.g., "the cloud") for aggregation with other updates provided by other computing devices. Thus, the platform can enable participation in a process known as "federated learning," in which a device determines a local update to a model based on locally stored data and then communicates the local update to a cloud service (e.g., in a privacy preserving and communication efficient manner) for aggregation to generate a global update to the model.

According to another aspect, in some implementations, in order to protect the applications from each other, each application can have its own enclave for certain functionalities (e.g., for every functionality) offered by the on-device platform. For example, the platform can authenticate an application before an interface for accessing the platform is returned to the application via a factory. The returned interface can then represent a sole view of the application's enclave in the platform. In one example implementation of this process, when an application connects to an API of the platform, the application can provide a signed package token that verifies the identity of the application. The application is not able to obtain the API interface without passing this authentication.

According to another aspect of the present disclosure, in some implementations, the on-device machine learning platform can completely abstract from an underlying machine learning engine. For example, the machine learning engine can be a TensorFlow engine, a neural network library, or other engines that enable implementation of machine-learned models for inference and/or training. Due to such abstraction, the machine learning platform can treat model artifacts as blobs which are generated in the cloud and then shipped to devices (e.g., via dynamic model download), where they are then interpreted by matching engines. In such fashion, the machine learning platform and its supported applications can be resilient against changes to the machine learning engine and/or agnostic/flexible to a particular engine or engine type employed.

According to another aspect, a toolkit that is complementary to the on-device platform can provide a set of tools (e.g., Python tools) to create and simulate models in the cloud before they are shipped as artifacts to devices. In some implementations, the toolkit can generate from the same source artifacts (e.g., Python source artifacts) for different versions of machine learning engines, or even different engine types (e.g., mobile-focused TensorFlow Lite versus a neural network library, etc.).

In some implementations, the on-device machine-learning platform can be included in or implemented as an application, such as, for example, a mobile application. For example, in the context of the Android operating system, the on-device machine-learning platform can be included in an Android Package Kit (APK) that can be downloaded and/or updated. In one particular example, the on-device machine-learning platform can be included in or implemented as a portion of a larger application that provides a number of different support services to other applications or the device itself. For example, in addition to the on-device machine-learning platform, the larger application can provide services that enable the computing device to interact with a digital distribution service (e.g., downloading applications and/or updates from an "app store") and/or other services. In another example, the on-device machine-learning platform can be included in or implemented as a portion of the operating system of the device, rather than as a standalone application.

The systems and methods of the present disclosure provide a number of technical effects and benefits. As one example technical effect and benefit, the on-device machine-learning platform can enable personalization of machine-learned models based on locally-stored device-specific training examples, thereby leading to higher accuracy inferences. Similarly, as described elsewhere herein, the on-device platform can enable participation of the device in "federated learning," in which local updates are aggregated to generate a global update, thereby leading to improved global model accuracy for all individuals.

As another example technical effect and benefit, the on-device machine-learning platform can enable secure inclusion of contextual signals into training examples and/or inference inputs. That is, context features can be added to training examples or inference inputs in a manner that maintains privacy and complies with user-defined permissions. Through the inclusion of context information, the accuracy of the inferences provided by the machine-learned models can be improved.

As another example technical effect and benefit, the on-device machine-learning platform can provide a centralized service so that applications do not need to manage (e.g., train and/or run) machine-learned models or interact with machine-learning engines. As such, a given application is not required to store, manage, train, and/or implement machine-learned model(s) but can instead simply communicate with the on-device machine learning platform to request and receive inferences from the model(s). This can enable the data size of applications to be smaller. It can also simplify the development and deployment of applications or other clients as application developers are not required to learn the intricacies of each different machine learning engine but can instead simply rely upon usage of the platform APIs.

Similar to the previous effect and benefit, the on-device machine-learning platform can also enable easy updating of a single centralized service rather than all applications. For example, when a new version or type of machine learning engine is launched, only the on-device platform is typically required to update to interact with the new engine, since the applications or other clients do not interact with the engine, but instead have the platform do so on their behalf. This can eliminate the need for applications to constantly ensure that they are compatible with the latest version(s) of machine learning engines, as they can instead rely upon the on-device platform to stay up-to-date as the engine technology advances.

As yet another example technical effect and benefit, the on-device machine-learning platform can improve communication network efficiency and usage. That is, under past paradigms where machine learning is performed by a server rather than on-device, various types of information (e.g., input data, training examples, inferences, model parameters, etc.) were required to be transmitted by the server to the device over a communications network (e.g., the Internet). However, since the present disclosure enables on-device prediction, training, example collection, and/or other machine learning tasks or functionality, such information is not required to be transmitted (at least in every instance) over a communications network. Therefore, communications network traffic, efficiency, and usage are improved. In addition, since the input data, training examples etc. is not being transmitted to and from a server, the security of the data may be increased.

With reference now to the Figures, example embodiments of the present disclosure will be discussed in further detail.

Example Devices and Systems

FIG. 1 depicts a block diagram of an example computing device 102 that includes an on-device machine learning platform 122 according to example embodiments of the present disclosure.

The computing device 102 can be any type of computing device including, for example, a desktop, a laptop, a tablet computing device, a smartphone, a computing device that is able to be worn, a gaming console, an embedding computing device, or other forms of computing devices. Thus, in some implementations, the computing device 102 can be a mobile computing device and/or a user computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor 112 to cause the computing device 102 to perform operations. The computing device 102 can also include a network interface 116 that enables communications over one or more networks (e.g., the Internet).

The on-device machine learning platform 122 can enable on-device prediction, training, example collection, and/or other machine learning tasks or functionality, which may be collectively referred to as "machine learning functions".

The on-device machine learning platform 122 may be in the form of one or more computer programs stored locally on the computing device 102 (e.g., a smartphone or tablet), which are configured, when executed by the device 102, to perform machine learning management operations which enable performance of on-device machine learning functions on behalf of one or more locally-stored applications 102a-c or other local clients. At least some of the on-device machine learning functions may be performed using one or more machine learning engines 128 implemented locally on the computing device 102. Performance of the on-device machine learning functions on behalf of the one or more locally-stored applications 120a-c or routines (which may be referred to as "clients") may be provided as a centralized service to those clients, which may interact with the on-device machine learning platform 122 via one or more application programming interfaces (APIs).

In addition, in some implementations, the on-device machine learning platform 122 can include a context provider that securely injects context features into collected training examples and/or client-provided input data used to generate predictions/inferences. Thus, the on-device machine learning platform 122 can enable centralized training example collection, model training, and usage of machine-learned models 132a-c as a service to applications 120a-c or other clients.

More particularly, the computing device 102 can store or otherwise include one or more applications 120a-c (e.g., mobile applications). The computing device 102 can also include and implement the on-device machine learning platform 122 and one or more machine-learned models 132a-c. For example, the machine-learned models 132a-c can be stored by the device 102 in a centralized model repository 130 that is managed by the platform 122.

According to one aspect of the present disclosure, the applications 120a-c can communicate with the on-device machine learning platform 122 via an API (which may be referred to as the "prediction API") to provide input data and obtain predictions based on the input data from one or more of the machine-learned models 132a-c. As an example, in some implementations, given a uniform resource identifier (URI) for a prediction plan (e.g., instructions for running the model to obtain inferences/predictions) and model parameters, the on-device machine learning platform 122 can download the URI content (e.g., prediction plan and parameters) and obtain one or more inferences/predictions by running the model (e.g., by interacting with a machine learning engine 128 to cause implementation of the model by the engine). In addition, the platform 122 can cache the content (e.g., within the repository 130) so that it can be used for subsequent prediction requests.

Thus, on-device machine-learned models 132a-c can be accessed by an application 120a-c by communicating with the on-device machine learning platform 122 via a client/service relationship. For example, a respective machine-learned model 132a-c can be provided for each application 120a-c and managed by the platform 122. In other implementations, two or more applications 120a-c can share a single machine-learned model 132a-c or a single application 120a-c can have two or more models 132a-c.

In some implementations, the machine-learning platform 122 can be a standalone multi-tenant service which can be referenced by applications 120a-c. As such, a given application 120a-c is not required to store, manage, train, and/or implement machine-learned model(s) 132a-c but can instead simply communicate with the on-device machine learning platform 122 to request and receive inferences from the model(s) 132a-c.

According to another aspect of the present disclosure, the computing device 102 can further include a centralized example database 124 that stores training examples received from the applications 120a-c. In particular, the on-device machine learning platform 122 can receive training examples from the applications 120a-c via an API (which may be referred to as the "collection API") and can manage storage of the examples in the centralized example database 124. For example, each application 120a-c that is a client or tenant of the platform 122 can have its own collection(s) of examples stored within the centralized example database 124 and the collection(s) can be supplemented and/or managed in an online fashion.

In some implementations, the on-device machine learning platform 122 can cause storage of each training example received from an application 120a-c (e.g., within its corresponding collection) according to one or more options parameters associated with the application 120a-c providing the training example. As one example, the options parameters can include a time-to-live parameter that defines a period of time for which training examples are stored (e.g., and are thereafter deleted). In some implementations, the options parameters can be predefined and/or adjusted through instructions provided to the platform 122 via the collection API.

According to another aspect of the present disclosure, in some implementations, the on-device machine learning platform 122 can securely inject context features descriptive of a context associated with the computing device 102 into the training examples. For example, upon receiving a training example from an application 120a-c, a context provider component of the on-device platform 122 can determine one or more context features and can store such context features together with the training example in the centralized example database 124. For example, the context features and the data provided in the new training example can be stored as a single database entry. The particular context features that are determined and then injected or otherwise associated and/or stored with a training example received from a particular application 120a-c can be specified by the options parameters for such particular application 120a-c. As described above, these options features can be adjusted or predefined via the collection API. Thus, an application 120a-c can control (e.g., via defining the options parameters) which context features or context types are injected into its training examples.

In some implementations, context features are injected on the service side, such that the context features never need to become directly available to applications 120a-c. In particular, in some implementations, the centralized example database 124 is not directly accessible by the one or more applications 120a-c, such that the context information stored with a particular training example is not accessible even to the application 120a-c that provided the training example.

In some implementations, the context features can be grouped or otherwise categorized according to a number of different context types. In general, each context type can specify or include a set of context features with well-known names and well-known types. One example context type is device information which includes the following example context features: audio state, network state, power connection, etc.

In some implementations, the context provider requests the value that is injected for a given context feature from the device (e.g., from a context manager 126 of the device) at the time/point of injection. Alternatively or additionally, the context provider can register as a listener to one or more context updates from the context manager 126 and can maintain a context feature cache of current values for the context features based on the one or more context updates. Then, when context features are injected, the context provider can simply access the context feature cache and inject the current value maintained in the cache for the particular context feature.

In addition or alternatively to injection of context features to training examples at storage time, the context provider can also perform injection of context features at inference time. In particular, similar to the above described process for training example collection, when a particular application 120a-c or other client requests (e.g., via the prediction API) for an inference to be generated on the basis of some client-provided input data, the context provider can inject or provide supplemental context features for input into the corresponding machine-learned model 132a-c alongside the input data. Thus, inferences can be made based at least in part on context information in addition to the client-provided input data, which may assist in improving the accuracy of the inferences.

According to another aspect, since certain applications 120a-c or other clients may have permission to access only certain of the context features or context types (e.g., as defined or controlled by a device user), the context provider can perform client permission control. In particular, in some implementations, the on-device machine learning platform 122 or other device component can maintain a mapping of which clients have permission to access which context types or context features. When context features are to be injected (e.g., either into a training example for storage or to supplement client-provided input data at inference time), the context provider can check the permission status of the corresponding application 120a-c or other client relative to the context features or context types to be injected. For example, the permission status for a particular application 120a-c and a context type can describe whether such application 120a-c has permission to access such context type. The context provider will inject only context features that are included in context types that the application 120a-c has permission to access, thereby preventing an application 120a-c from accessing (even in a second-hand fashion) context features/types to which it does not have permission to access.

Similar to the time-to-live options parameter described above, in some implementations, each context feature can have an expiration period associated therewith or assigned thereto. This expiration period information can be associated with each training example that contains context feature(s). In some implementations, at the conclusion of the expiration period for a particular context feature provided in a particular training example, the value for such context feature can be deleted or otherwise removed from such training example. Alternatively, the entire training example can be deleted or otherwise removed.

Furthermore, in some implementations, in response to a change to a permission status for a particular application 120a-c or other client relative to a particular context feature or context type, the on-device platform 122 can delete from the centralized example database 124 any values or entries for such context feature(s) or type(s) that are associated with training examples associated with the particular application 120a-c. In addition, in some implementations, the corresponding model(s) 132a-c can be re-trained on the remaining data after deletion of the context feature value(s).

According to yet another aspect of the present disclosure, the applications 120a-c can communicate with the on-device machine learning platform 122 via an API (which may be referred to as the "training API") to cause re-training or updating of a machine-learned model 132a-c based on training examples stored in the centralized example database 124. As an example, in some implementations, given a URI for a training plan (e.g., instructions for training the model), the on-device machine learning platform 122 can run training of the model 132a-c (e.g., by interacting with a machine learning engine 128 to cause training of the model 132a-c by the engine 128) based on previously collected examples. For example, the training can be performed in the background at scheduled times and/or when the device is idle.

After retraining of the model 132a-c, the re-trained model 132a-c can be used to provide inferences as described elsewhere herein. Typically, these inferences will have higher accuracy since the model 132a-c has been re-trained on data that is specific to the user. Thus, the on-device machine learning platform 122 can enable centralized example data collection and corresponding personalization of machine-learned models 132a-c as a service to applications 120a-c or other clients.

According to another aspect, in some implementations, the machine learning platform 122 can upload logs or other updates regarding the machine-learned models 132a-c to the cloud for detailed analytics of machine learning metrics. As an example, in some implementations, the on-device platform 122 can determine an update that describes the parameters of a re-trained machine-learned model 132a-c or changes to the parameters of the machine-learned model 132a-c that occurred during the re-training of model 132a-c (e.g., a "gradient"). The platform 122 can transmit the update to a central server computing device (e.g., "the cloud") for aggregation with other updates provided by other computing devices. Thus, the platform 122 can enable participation in a process known as "federated learning," in which a device determines a local update to a model 132a-c based on locally stored data and then communicates the local update to a cloud service (e.g., in a privacy preserving and communication efficient manner) for aggregation to generate a global update to the model 132a-c.

According to another aspect, in some implementations, in order to protect the applications 120a-c from each other, each application 120a-c can have its own enclave for certain functionalities (e.g., for every functionality) offered by the on-device platform 122. For example, the platform 122 can authenticate an application 120a-c before an interface for accessing the platform 122 is returned to the application 120a-c via a factory. The returned interface can then represent a sole view of the application's enclave in the platform 122. In one example implementation of this process, when an application 120a-c connects to an API of the platform 122, the application 120a-c can provide a signed package token that verifies the identity of the application 120a-c. The application 120a-c is not able to obtain the API interface without passing this authentication.

In some implementations, each application's enclave within the platform 122 is account independent. Thus, multiple accounts associated with the same user profile on the computing device 102 can share the same training data and state. This reflects that multiple accounts in most cases are for the same user and different users on a computing device would use different user profiles instead.

In some implementations, for certain functionality (e.g., accessing context), permissions are required. As such, in some implementations, an application 120a-c that wants to use a particular context in the platform 122, even if it never directly touches the context because the context stays within the platform 122, to have permission to access the particular context. In some implementations, all relevant permissions can be verified in the client and then passed on to the platform call, logically letting the platform 122 operate with this set of permission(s). In some implementations, the platform 122 can request that the user consent to the platform 122 having access to all permissions. In some instances, context may also require that a particular user be logged in. Such user can be specified by the application for those cases or specified by an optional field in the options for context injection. However, in some implementations, the user may not be automatically detected by the platform 122. In some implementations, the API itself does not require authentication with such specific user account.

According to another aspect of the present disclosure, in some implementations, the on-device machine learning platform 122 can completely abstract from an underlying machine learning engine 128. For example, the machine learning engine 128 can be a TensorFlow engine, a neural network library, or other engines that enable implementation of machine-learned models 132a-c for inference and/or training. Due to such abstraction, the machine learning platform 122 can treat model artifacts 132a-c as blobs which are generated in the cloud and then shipped to devices (e.g., via dynamic model download), where they are then interpreted by matching engines 128. In such fashion, the machine learning platform 122 and its supported applications 120a-c can be resilient against changes to the machine learning engine 128 and/or agnostic/flexible to a particular engine 128 or engine type employed.

According to another aspect, a toolkit that is complementary to the on-device platform 122 can provide a set of tools (e.g., Python tools) to create and simulate models in the cloud before they are shipped as artifacts to devices. In some implementations, the toolkit can generate from the same source artifacts (e.g., Python source artifacts) for different versions of machine learning engines, or even different engine types (e.g., mobile-focused TensorFlow Lite versus a neural network library, etc.).

In some implementations, the on-device machine-learning platform 122 can be included in or implemented as an application, such as, for example, a mobile application. For example, in the context of the Android operating system, the on-device machine-learning platform 122 can be included in an Android Package Kit (APK) that can be downloaded and/or updated. In one particular example, the on-device machine-learning platform 122 can be included in or implemented as a portion of a larger application that provides a number of different support services to other applications 120a-c or the device 102 itself. For example, in addition to the on-device machine-learning platform 122, the larger application can provide services that enable the computing device 102 to interact with a digital distribution service (e.g., downloading applications and/or updates from an "app store") and/or other services. In another example, the on-device machine-learning platform 122 can be included in or implemented as a portion of the operating system of the device 102, rather than as a standalone application.

Figure 2:
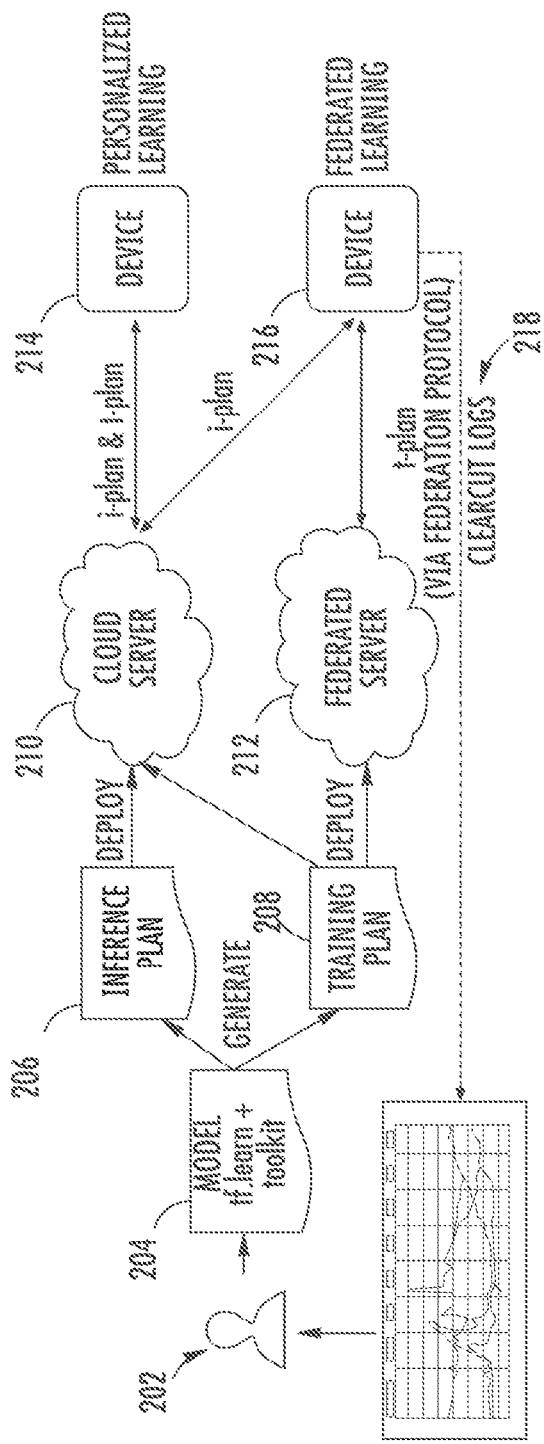
FIG. 2 depicts a graphical diagram of an example machine-learned model deployment according to example embodiments of the present disclosure.

FIG. 2 depicts a graphical diagram of an example machine-learned model deployment according to example embodiments of the present disclosure. In particular, an application developer 202 can interact with a toolkit to generate and test a model 204. The model can be split into or otherwise represented at least in part by an inference plan 206 and a training plan 208.

A "plan" can include a protocol buffer (AKA "protobuf") that contains a graph (e.g., a TensorFlow graph) and instructions on how to run the graph. As one example, a plan can be a declarative description of a sequence of operations to perform on a graph (e.g., a TensorFlow graph) which also embeds the graph itself. The plan can describe how to query the collection for training data, how to feed it into the graph, and/or how to produce and deliver outputs.

FIG. 2 illustrates two alternative (but optionally complementary) deployment schemes. In a first scheme, the inference plan 206 and the training plan 208 are both deployed to a cloud server 210. The cloud server 210 provides the inference plan 206 and the training plan 208 to a device 214.

The device 214 can implement the inference plan 206 to generate inferences. The device 214 can alternatively or additionally implement the training plan 208 to perform on-device training based on locally stored data, which can also be referred to as "personalization" or "personalized learning."

In a second deployment scheme, the inference plan 206 is deployed to the cloud server 210 as described above. The cloud server provides the inference plan 206 to a device 216. The device 216 can implement the inference plan 206 to generate inferences.

However, in addition or alternatively to deployment of the training plan 208 to the cloud server 210, in the second scheme the training plan 208 is deployed to a federated server 212. The federated server 212 provides the training plan 208 to the device 216. The device 216 can implement the training plan 208 to perform on-device training based on locally stored data. After such on device learning, the device 216 can provide an update to the federated server 212. For example, the update can describe one or more parameters of the re-trained model or one or more changes to the parameters of the model that occurred during the re-training of the model.

The federated server 212 can receive many of such updates from multiple devices and can aggregate the updates to generate an updated global model. The updated global model can then be re-sent to the device 216.

In addition, in some implementations, the device 216 can further provide logs 218 or other updates regarding the machine-learned models that can be used by the developer 202 (e.g., in conjunction with the toolkit) to obtain detailed analytics of machine learning metrics. Example metrics that can, in some implementations, be computed based on the logs 218 include plots, graphs, or visualizations of checkin request outcomes, traffic (e.g., volume), loss and accuracy model metrics, phase duration, or other metrics.

Figure 3:
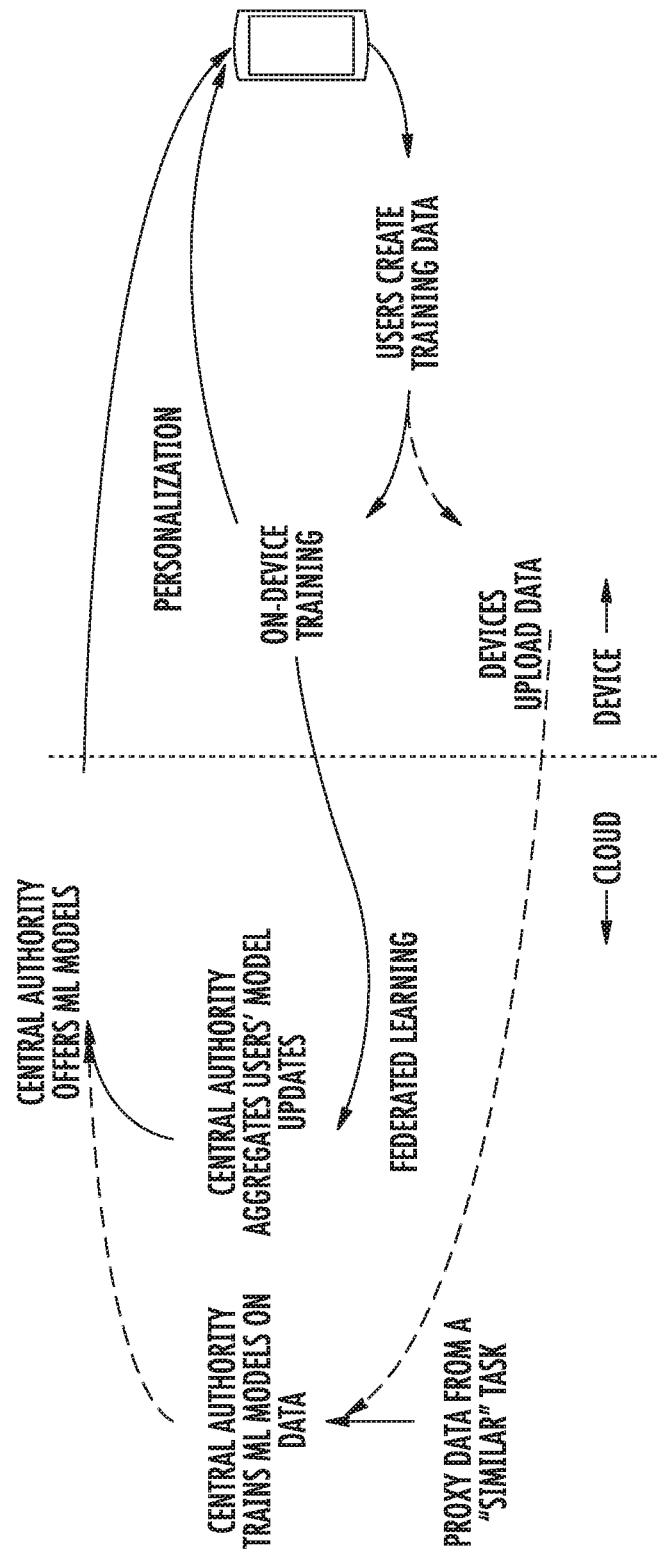
FIG. 3 depicts a graphical diagram of example personalization and federated learning data flows according to example embodiments of the present disclosure.

FIG. 3 depicts a graphical diagram of example personalization and federated learning data flows according to example embodiments of the present disclosure.

More particularly, FIG. 3 depicts three different learning data flows which may in some instances be used in a complementary fashion. In a first data flow, shown primarily in dash line at the bottom of FIG. 3, training data is generated on a user device. The training data is uploaded to a central authority which then trains or re-trains a machine-learned model based on the uploaded data. The model is then sent to the user device for use (e.g., on-device inference).

In a second data flow which can be referred to as personalization or personalized learning, the training data created on the user device is used to train or re-train the model on the device. The re-trained model is then used by such device. This personalized learning enables per-device models to be trained and evaluated without centralized data collection, thereby enhancing data security and user privacy.

In a third data flow which can be referred to as federated learning, the training data created on the user device is used to train or re-train the model on the device. Thus, the actual user-specific training data is not uploaded to the cloud, thereby enhancing data security and user privacy.

After such on device learning, the user device can provide an update to a central authority. For example, the update can describe one or more parameters of the re-trained model or one or more changes to the parameters of the model that occurred during the re-training of the model.

The central authority can receive many of such updates from multiple devices and can aggregate the updates to generate an updated global model. The updated global model can then be re-sent to the user device. This scheme enables cross-device models to be trained and evaluated without centralized data collection.

Figure 4:
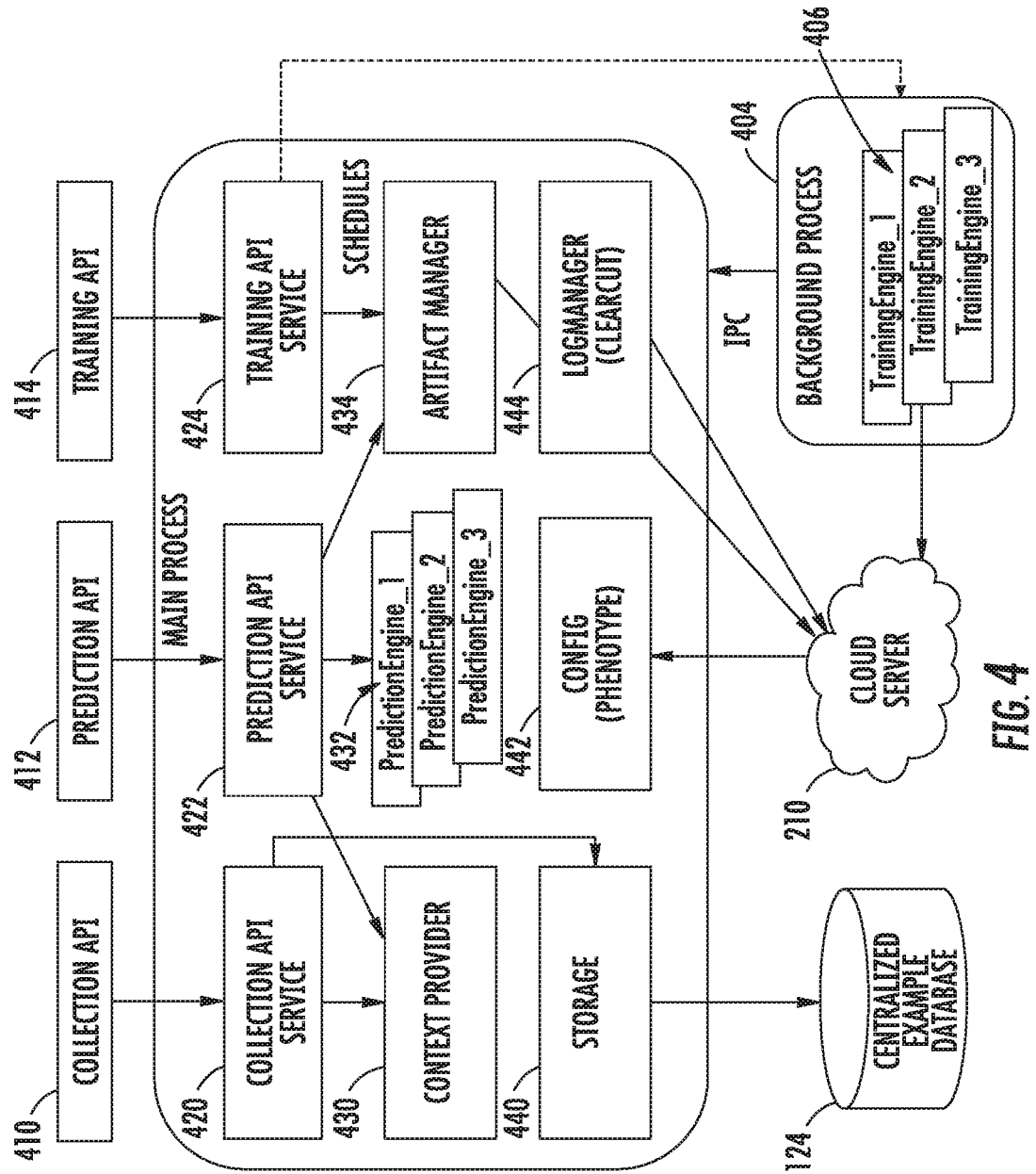
FIG. 4 depicts a block diagram of an example on-device machine learning platform according to example embodiments of the present disclosure.

FIG. 4 depicts a block diagram of an example on-device machine learning platform according to example embodiments of the present disclosure. The platform illustrated and described with reference to FIG. 4 is provided as one example implementation only. Many different implementations of the on-device machine learning platform described herein are possible. The example on-device machine learning platform can include or implement a main process 402 and a background process 404.

The main process 402 can handle all API requests. The main process 402 can provide a collection API service 420 that provides training example collection services via a collection API 410; a prediction API service 422 that provides inference generation services via a prediction API 412; and a training API service 424 that provides model training services via a training API 414.

In some implementations, the collection API service 420 can persist training examples with automatic retention policies. In some implementations, the training API service 424 can automatically execute training sessions at scheduled times and conditions as an invisible process, drawing data from an example collection. In some implementations, the prediction API service 42 can allow clients to run inference based on a given model, which may result from the trainer or from external sources.

In some implementations, the background process 404 can only host training and other periodic maintenance tasks. It can be transactional and designed to be teared down. In some implementations, the background process 404 obtains its state solely from the main process 402.

As will be discussed further below, the context provider 430 injects context information into examples, both for the collection API service 420 and the prediction API service 422. The storage component 440 can enable and perform storage of examples (e.g., in the centralized example database 124) as well as bookkeeping state. It can be based on LevelDB.

Multiple prediction engines 432 can be accessed by the prediction API service 422, depending on the prediction plan type. Prediction and training plans, as well as model parameters, are provided by or otherwise managed by the artifact manager 434. The artifact manager 434 can support retrieving artifacts from a cloud server 210, from application assets, and/or from files. It can also support mutable artifacts, for example, for storing training results which are consumed by a predictor or another trainer.

The background process 404 can host multiple training engines 406 which are chosen based on the training plan. For Federated Learning, the background process 404 can communicate with a federated learning server to upload training results for accumulation using privacy preserving techniques (e.g., secure aggregation).

The log manager 444 can upload logs regarding the machine-learned models to the cloud server 210 for detailed analytics of machine learning metrics.

More particularly, in some implementations, the collection API service 420 can be a facility that allows, manages, and/or performs storage of training examples in a centralized example database 124 for later retrieval by the background process 404 (e.g., to perform background training). For example, the collection API service 420 can interact with a storage component 440 to manage storage of the training examples in the centralized example database 124.

The collection API 410 can be simple: once a client has been authenticated, it gets access to an object as demonstrated in the example code below (where Task is an approach to represent asynchronous API calls; Task<Void> may be ignored or listened to for observing errors):

```
class Learning {
    ...
    static CollectionClient getCollectionClient(CollectionOptions
        options);
    ...
}
interface CollectionClient {
    Task<Void> add(Example example);
    Task<Void> clear( );
}
```

Learning.getCollectionClient(options) can allow access to and configuration of an exampleCollection. The 'options' parameter can contain at least the name of a collection. If no further options are provided, the default or previously configured options can be used. Example options include time-to-live of content and context that should be injected into a learning event before it is stored in the database 124.

CollectionClient.add(example) can add a new example to the store.

CollectionClient.clear( ) can allow reset of the collection's content.

The training API 414 and corresponding training API service 424 can schedule the background process 404 to perform training. The background process 404 can implement or interact with one or more training engines 406 to pull data from an example collection and execute a training plan. A plan can be a declarative description of a sequence of operations to perform on a graph (e.g., a TensorFlow graph) which also embeds the graph itself. The plan can describe how to query the collection for training data, how to feed it into the graph, and/or how to produce and deliver outputs.

Each training plan type can be associated with a training plan engine 406. The on-device machine learning platform can thus be extended by new types of plans, making it capable of representing any kind of machine learning execution that fits into the general model of background training.

As one example, an example API to the trainer is provided below:

```
class Learning {
    ...
    static TrainerClient getTrainerClient(TrainerOptions options);
    ...
}
interface TrainerClient {
    Task<Void> start(@Schedule int schedule);
    Task<Void> stop( );
}
```

Learning.getTrainerClient(options) can take options that contain at least a trainer session name, and create or reconfigure a training session. Session names can be constants, similar to package names, chosen by the application, and the session itself can be eternal. The options can also specify the plan type, the method by which the plan is obtained, and any parameters specific to a plan type. Plans may be obtained in different ways depending on the plan type; for example, for federation, the plan can be downloaded from the federated learning server; for personalization, it might be contained in the assets or downloaded from a cloud server 210.

TrainerClient.start(schedule) can start the training session based on the options passed in at interface creation time and with the given schedule. The schedule can be either continuously or one-off. In some implementations, in both cases, training will only be scheduled if device conditions allow. As an example, in some implementations, training will only be scheduled or otherwise performed if the device is both idle and charging.

TrainerClient.stop( ) can allow cancellation and/or removal of a training session.

The prediction API 412 can allow a client to feed input and derive predictions from it based on a trained model. Like the trainer, the predictor can be plan-driven in some implementations, where the plan is a declarative description of what operations to perform on a graph, and how to obtain inputs and produce outputs.

As one example, an example prediction API code is as follows:

```
class Learning {
    ...
    static PredictorClient getPredictorClient(PredictorOptions options);
    ...
}
interface PredictorClient {
    Task<PredictionResult> predictRank(Example example, Map<String,
        Example> candidates);
}
```

Learning.getPredictorClient( ) can return a predictor based on the given options. The options can specify how to obtain plan and model parameters for prediction. They can also specify which context features should be automatically injected into candidate examples before being passed into the prediction engine.

predictRank( ) can return a prediction for a ranking problem derived from the given context example and the specified candidates. Additional application-specific prediction methods can be introduced over time.

The below code illustrates one example usage of the three example APIs 410, 412, and 414 described with reference to FIG. 4.

First, options for configuration can defined. Typically those options can be obtained by the application from phenotype config component 442, but for reasons of simplification, they can be defined as static constants:

```
class MyLearningConfig {
    static final ExampleCollectionOptions COLLECTION_OPTIONS =
        ExampleCollectionOptions.create("myCollection)
            .setTimeToLive(TimeUnit.DAYS.toMillis(7))
            addContext(ContextType.USER_LOCATION);
    static final TrainerOptions TRAINER_OPTIONS =
        TrainerOptions.create("myTrainer")
            .setCollectionName(COLLECTION_OPTIONS.getCollectionName( ))
            .setPersonalized(
                "mrepo://myApp/training_plan",
                "mrepo://myApp/initial_params",
                "file:trained_params");
    static final PredictorOptions PREDICTOR_OPTIONS =
        PredictorOptions.create("myPredictor")
            .setRanking(
                "mrepo://myApp/prediction_plan",
                TRAINER_OPTIONS getTrainedParamsUri( ))
            .addContext(ContextType.USER_LOCATION);
}
```

Note how URIs can be used to refer to artifacts describing training and prediction plans, as well as model parameters. The plans can encode a graph (e.g., a TensorFlow graph) and information how to execute the graph. In some implementations, the plans can be created by the tools (e.g., Python tools) included in the corresponding toolbox. In some implementations, The model parameters can be opaque representations of weights associated with a plan. URIs can refer to a "model repository" (mrepo:), implying that they are downloaded to the device (e.g. from the cloud server 210), but can also refer to files cached locally (file:). For example, an artifact manager 134 can manage download of the model artifacts from the server 210 and/or other model management tasks.

In the case of a file artifact, dependencies can be defined between the APIs. For example, the TrainerOptions can be defined to generate a file artifact with trained parameters which are consumed by the prediction API service. The on-device machine learning platform can internally deal with such input-output dependencies by delaying operations or rejecting them with an appropriate error code if a required input has not yet been produced.

Giving the above configuration, the platform can include some API code where training examples are continuously fed into the collection. As one example, the following code can include add training examples:

```
ExampleCollectionClient collection =
    Learning.getExampleCollectionClient(COLLECTION_OPTIONS);
...
void onSomeEvent(SomeEvent event) {
    collection.add(eventToExample(event));
}
```

Each time an example is added to the cache, the context which was specified with the COLLECTION OPTIONS can be added as a feature. The user does not need to take care of limiting size or lifetime of added data, which can be dealt with based on the provided options.

In order to schedule training, an application can typically at creation time ensure that background training is configured using current options and scheduled. In some implementations, if training has been already scheduled before and configuration has not changed, it will be not affected by this example call:

```
void onCreated( ) {
    TrainerClient trainer =
    Learning.getTrainerClient(TRAINER_OPTIONS);
    trainer.start(Schedule.CONTINUOUSLY);
}
```

Finally, another piece of example code can use the prediction API to leverage training results. As one example, this can look as provided in the example code below:

```
PredictorClient predictor = Learning.getPredictorClient(PREDICTOR_OPTIONS);
...
SomeEvent predict(SomeEvent event, Map<String, SomeEvent> candidates) {
    PredictionResult result = predictor.predictRank(eventToExample(event),
candsToExample(candidates));
    if (result.notAvailable( )) {
        // This can happen if artifacts aren't yet downloaded or computed by training
        Log.warn("prediction not yet available, using default")
        return candidates.iterator( ).next( );
    }
    return candidates.get(result.getKeys( )[0]);
}
```

As already mentioned, in some implementations, the context provider 430 of on-device machine learning platform can inject context features into learning events. This can happen on service side, such that context never needs to become directly available to applications.

Two example points where context can be injected are:
1. Before an example is stored into example collection. The injected context can be specified by CollectionOptions.
2. Before an example is passed to the prediction engine. The injected context can be specified by PredictorOptions.

In general, each context category can specify a set of features with well-known names and well-known types that are added to the Example (e.g., TensorFlow example proto). The value that is injected for a given context feature might be requested from the system at the point of injection, or it might be a cached value which the platform's internal context provider 430 periodically updates.

Example context features include: Audio State; Day Attributes; Calendar; Detected Activity; User-Specific Places (e.g., "home" vs. "work"; Network State; Power Connection; Screen Features; User Location; User Location Forecast; WiFi Scan Info; Weather; or other context features.

Importantly, the training examples and context features described herein are simply provided for the purposes of illustrating example data that could be stored with training examples or used to provide inferences by the on-device platform. However, such data is not collected, used, or analyzed unless the user has provided consent after being informed of what data is collected and how such data is used. Further, the user can be provided with a tool to revoke or modify the scope of permissions. In addition, certain information or data can be treated in or more ways before it is stored or used, so that personally identifiable information is removed or stored in an encrypted fashion.

The on-device platform does not need any context itself, so the context provider 430 collects context for client applications. For example, a client application may need "location" as a feature for its machine learning model. Such application can explicitly inform the on-device platform that the "location" context is needed.

The on-device platform can first check whether the client application has permission to access device location. If not, the platform does not give the context to the client. Otherwise, if the application does have permission, the location context will be populated for the client once it sends the platform a training example. Thus, in some implementations, at each instance in which a client sends the on-device platform an example, the platform examines their permissions and decides whether the client has the permissions to access the context they claimed.

Note that, in some implementations, the actual context content is not provided to the application. Instead, the context is simply populated with the training example for the client. The training examples will be kept within the on-device platform database, so the client cannot access the real context content.

In some implementations, certain types of context need a user account to access, like place alias and calendar. In some implementations, the context provider 430 itself does not indicate which account to use for context. In such cases, the client application should specify the account. In some implementations, if no account is specified by the client, only context that does not require account will be provided for the client.

The context the on-device platform is using is generally provided by a context manager (e.g., 126 as shown in FIG. 1). The context manager can be located in a number of places, including, for example, within the platform, within an application that includes the platform, and/or within an operating system of the device. In some implementations, to improve performance, the context provider 430 can register a listener to the context manager and always keeps the latest context updates in the on-device platform memory.

In some implementations, the on-device platform can perform or include stale context expiration. In some implementations, if users turn off a context signal on the device (e.g., turn off location or activity recognition), the context manager does not inform the on-device platform that the context is turned off. Instead, the context manager simply stops sending the on-device platform the context updates for these context(s). Thus, to avoid use of stale context for future events, the platform can cause stale context to expire. In particular, based on the context properties, different expiration time periods can be defined for each context feature or context type. Once the context has reached its expiration time period is can be deleted.

Another example context feature includes the place aliases context feature. In particular, whether a user is at home or at work is an important feature for many client applications. Considering that the user's home/work places do not change frequently, the platform can ask for the current home/work alias once the context provider 430 is constructed. If the user has consented to use of such information, the users' home/work places can be cached, and the context provider 430 can use location context to determine whether a user is at home or at work by comparing the location context to the cached locations. In some implementations, the places alias information can be received from the context manager or from a places API.

The context manager can deliver contexts in at least the two following ways. In a first example, the on-device platform can register as a listener. In this case, the on-device platform can maintain a cache of updated contexts, which also means that, in some implementations, the on-device platform is an always-on service. With a listener, the updated data can be kept in the cache.

The benefits of registering as a listener include:

1. Low latency. All contexts are cached within the on-device platform, and are transformed to machine learning friendly formats.

2. If IPCs (Inter Process Call) to the on-device platform is in high rate, caching contexts saves battery.

In a second example, the on-device platform can get current contexts in one shot. In this case, the context manager can provide another API to get all current contexts in one shot. If this API is used, the on-device platform typically would not maintain a cache of contexts, but instead gets current contexts on demand.

In this mode, the context manager is asked to keep the updated contexts for the platform, so the platform typically obtains extra UDC permissions, which are not needed in the first option.

The benefits of the one shot mode include that if IPCs to the on-device platform is in low rate, it may save battery.

In some implementations, the on-device platform may obtain user permissions to all contexts listed above, but certain clients may not have the same permissions as the on-device platform has. So the platform can control the permissions for clients. In some implementations, this can be done by using a package manager to extract the permissions associated with a client application. The platform can maintain a mapping between contexts to permissions. Thus, a client will typically explicitly claim what contexts it wants to use when it registers itself with the on-device platform. The platform checks whether the client has the permissions to access the requested contexts. Only contexts to which the application has permission will be used to train and inference the corresponding model.

In addition, it is possible that the permissions of a client are changed on the fly. For example, a user may approve an application to use his location when he feels the application may be useful, but then revoke the permission. To handle this case, each time a new event comes from the client, the platform can check their existing permissions and involve the corresponding contexts with the event to train.

During the inference, the platform can also analyze current client permissions to allow use of the context features for the prediction. As such, in some implementations, the machine-learned models can accept missing features for training and inference.

According to another aspect, in some implementations, to use the on-device platform API, clients can add an API key to their application. For example, applications can be signed with a digital certificate for which clients hold the private key. The application can obtain the key by registering with a central authority that manages the API.

One example authorization procedure can include:

1. The on-device platform gets a package name and API key pair when a client registers to the on-device platform. The on-device platform sends the package name and API key pair to a central authority for verification.

2. Once the client is verified, the on-device platform will generate a platform key for the client to use on that device.

3. For future API calls in that device, the client should provide the platform key to the on-device platform.

The on-device platform can check whether the platform key matches the package name and API key. However, the on-device platform typically does not send them to the central authority to verify again.

In some instances, a device can be shared by more than one user. As such, the on-device platform can extract a primary account from a list when an API is used. The on-device platform can tie the training data to the primary account, and update the related model. If the model for the account is not available on the device, the on-device platform can download the model for the client application from cloud or use a base model (e.g., average model in Federated Learning).

According to another aspect, in some implementations, a user can clear his location history or account history. In such instances, the on-device platform can remove all the corresponding contexts. In addition, in some implementations, the platform can re-train the model using remaining contexts for this user in this case.

Figure 5A:
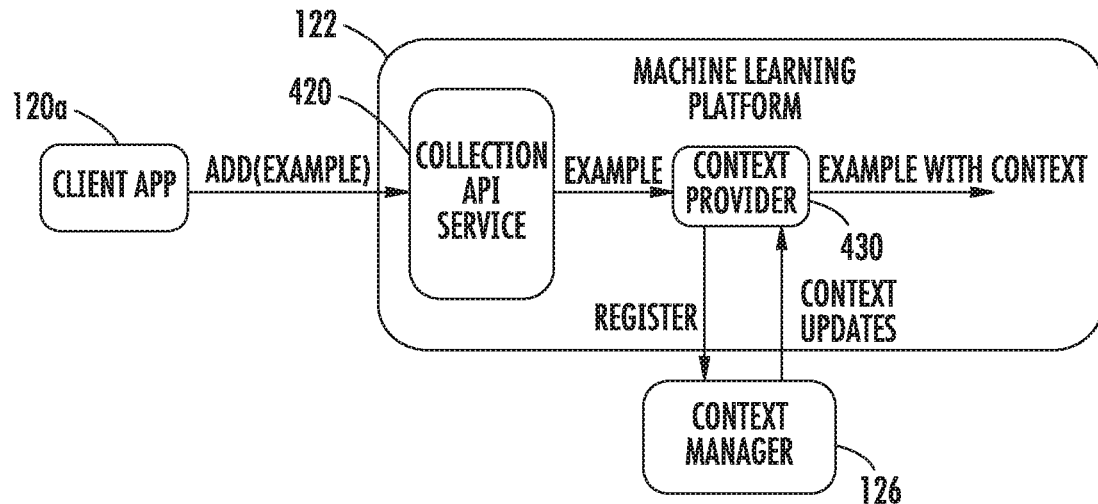
FIGS. 5A and 5B depict block diagrams of an example machine learning platform injecting context features according to example embodiments of the present disclosure.
Figure 5B:
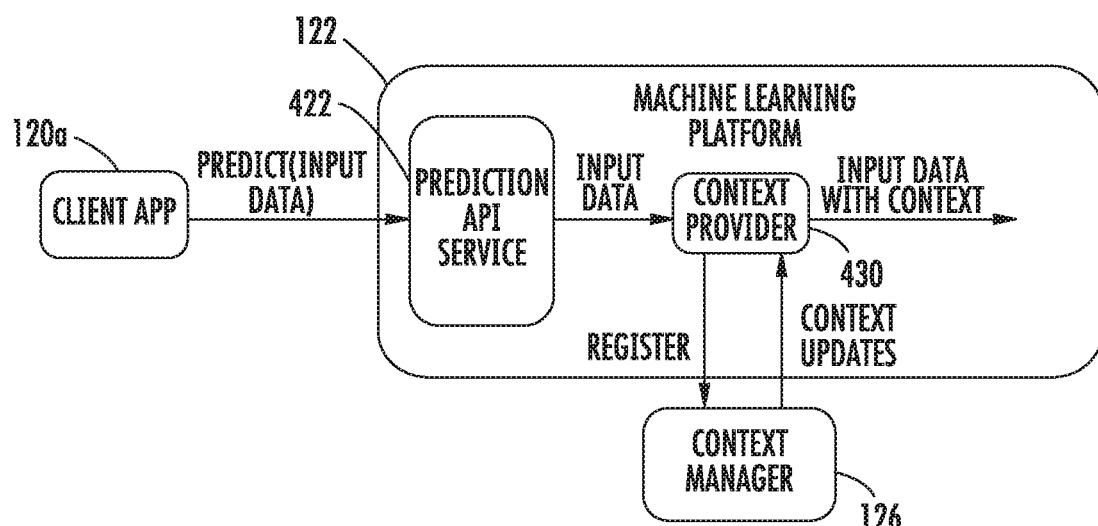

As examples, FIGS. 5A and 5B depict block diagrams of an example machine learning platform 122 injecting context features according to example embodiments of the present disclosure. In particular, FIG. 5A depicts the context provider 430 injecting context features before a training example an example is stored into example collection; while FIG. 5B depicts the context provider 430 injecting context features before an example is passed to a prediction engine implementing a machine-learned model.

Figure 6A:
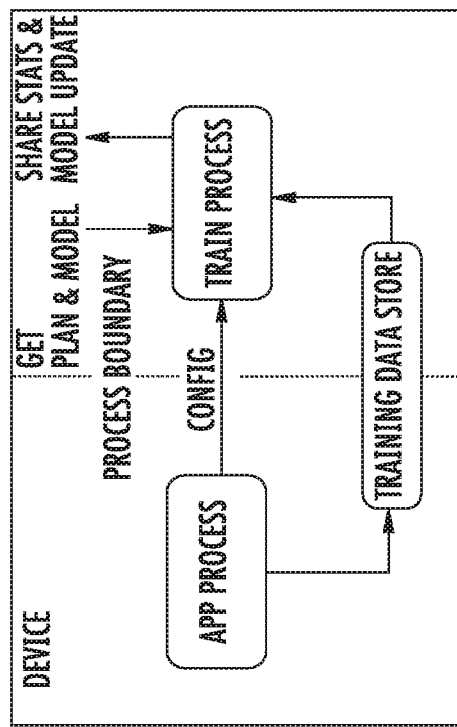
FIGS. 6A and 6B depict block diagrams of example devices performing model training according to example embodiments of the present disclosure.
Figure 6B:
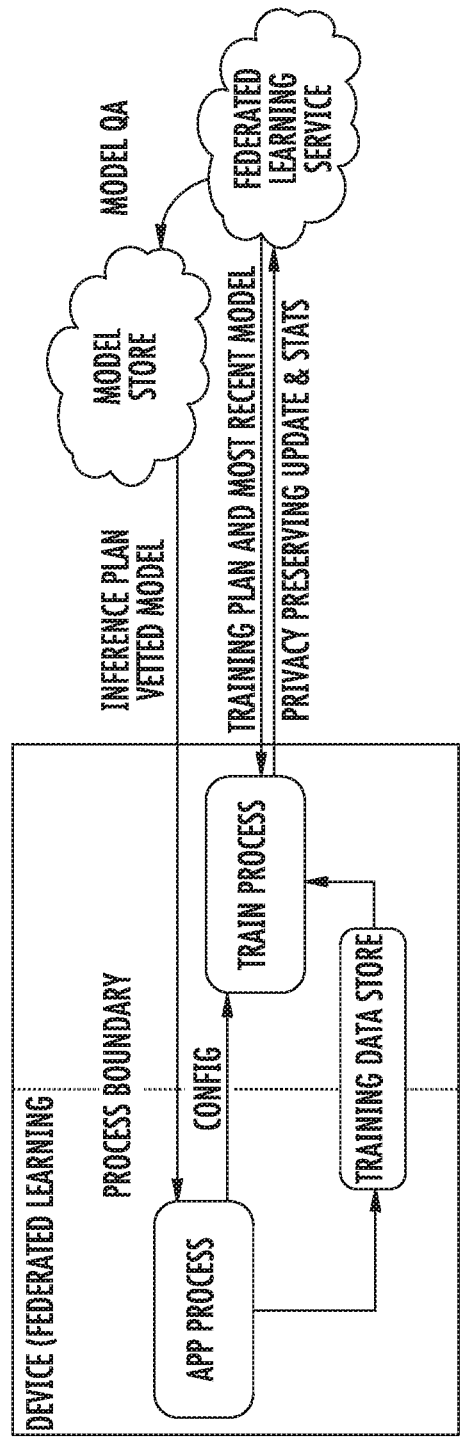

FIGS. 6A and 6B depict block diagrams of example devices performing model training according to example embodiments of the present disclosure. In particular, FIGS. 6A and 6B illustrate a background training process.

As illustrated in FIG. 6A, an application process can feed training data into a training data store. A training process can be scheduled in the background (e.g., if allowed by certain device conditions such as, for example, idle and/or plugged in).

The training process can pick up a model state and training plan, repeatedly pick data from the cache to train the model, and then eventually publish statistic(s) and model update message(s) (e.g., to a cloud server). In some implementations, as the training phase may be long (e.g., minutes), the training process can suspend and resume based on changing device conditions.

FIG. 6B is similar to FIG. 6A except that it includes a federated learning service that enables federated learning. As illustrated in FIG. 6B, the training plan and model can be distributed by the federated learning service. The training process can perform training in the background to generate a model update. The model update can be uploaded to the federated learning service (e.g., for use in aggregation). In addition, in some implementations, a quality assurance (e.g., a semi-automated quality assurance) can extract learned models and distribute the models back to the devices.

Figure 7:
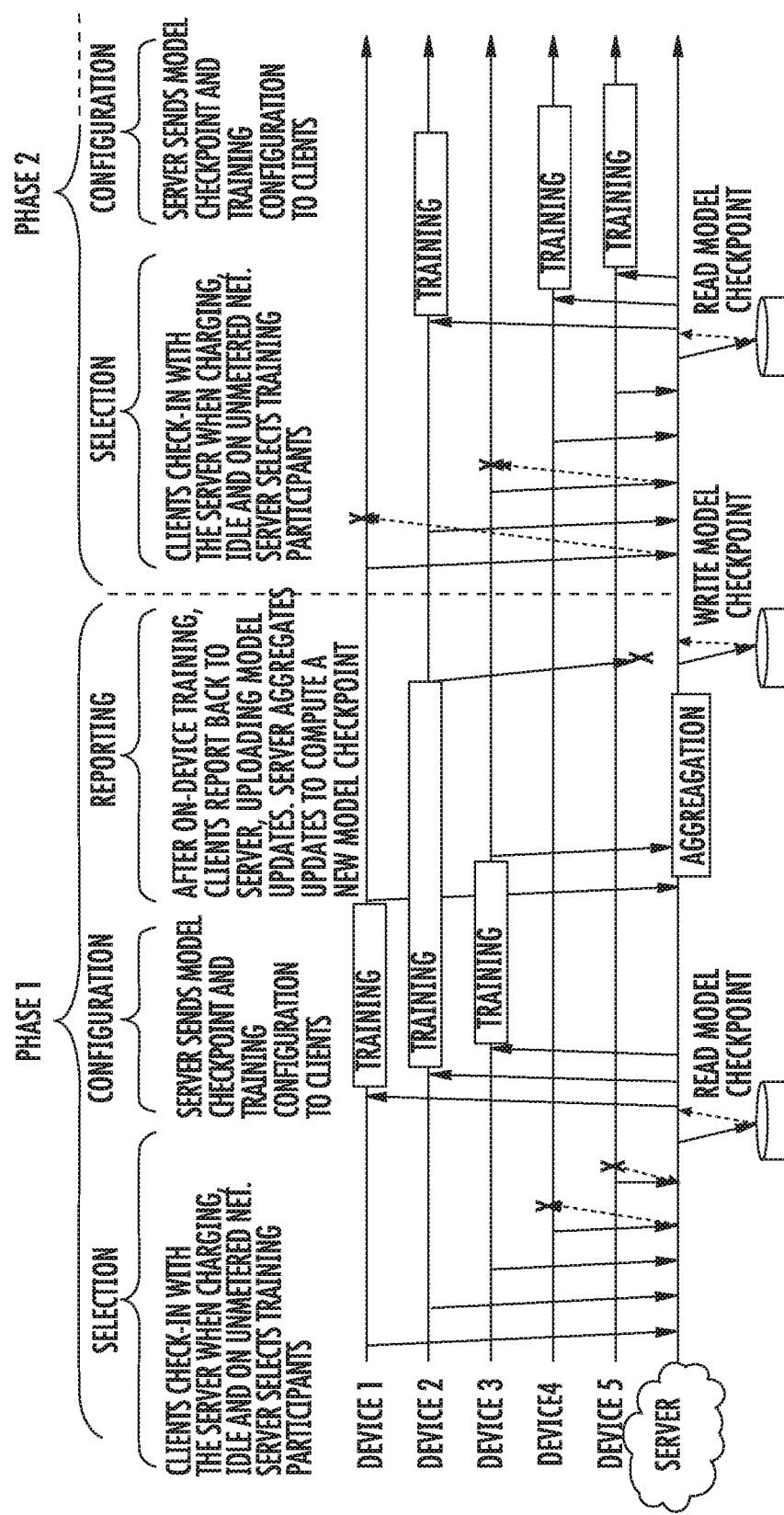
FIG. 7 depicts a graphical diagram of an example federated learning process according to example embodiments of the present disclosure.

FIG. 7 depicts a graphical diagram of an example federated learning process according to example embodiments of the present disclosure.

Example Methods

Figure 8:
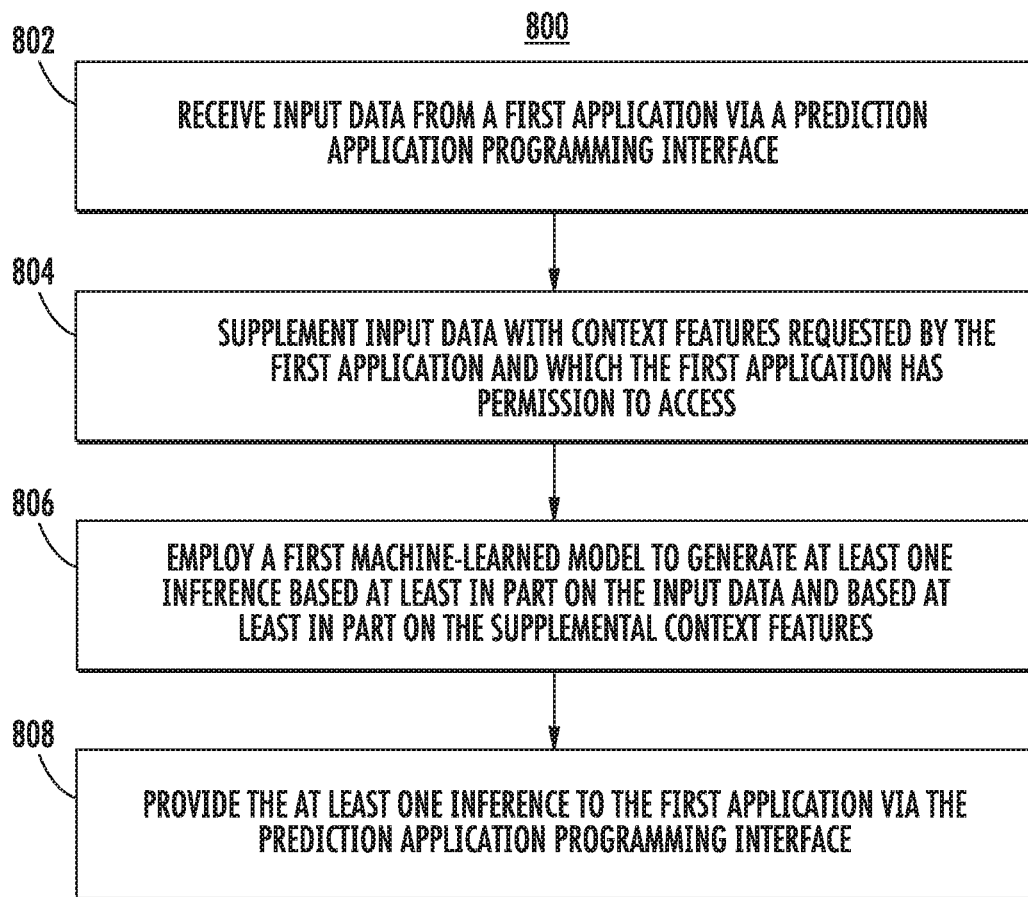
FIG. 8 depicts a flow chart of an example method to generate inferences using machine-learned models according to example embodiments of the present disclosure.

FIG. 8 depicts a flow chart of an example method 800 to generate inferences using machine-learned models according to example embodiments of the present disclosure.

At 802, a computing system can receive input data from a first application via a prediction application programming interface.

At 804, the computing system can supplement the input data with context features requested by the first application and which the first application has permission to access. In some implementations, at 804, the computing system can determine a permission status for the first application relative to each of one or more context types. In some implementations, the input data is supplemented only with context features that are included in context types that the first application has permission to access.

At 806, the computing system can employ a first machine-learned model to generate at least one inference based at least in part on the input data and based at least in part on the supplemental context features. At 808, the computing system can provide the at least one inference to the first application via the prediction application programming interface.

Figure 9:
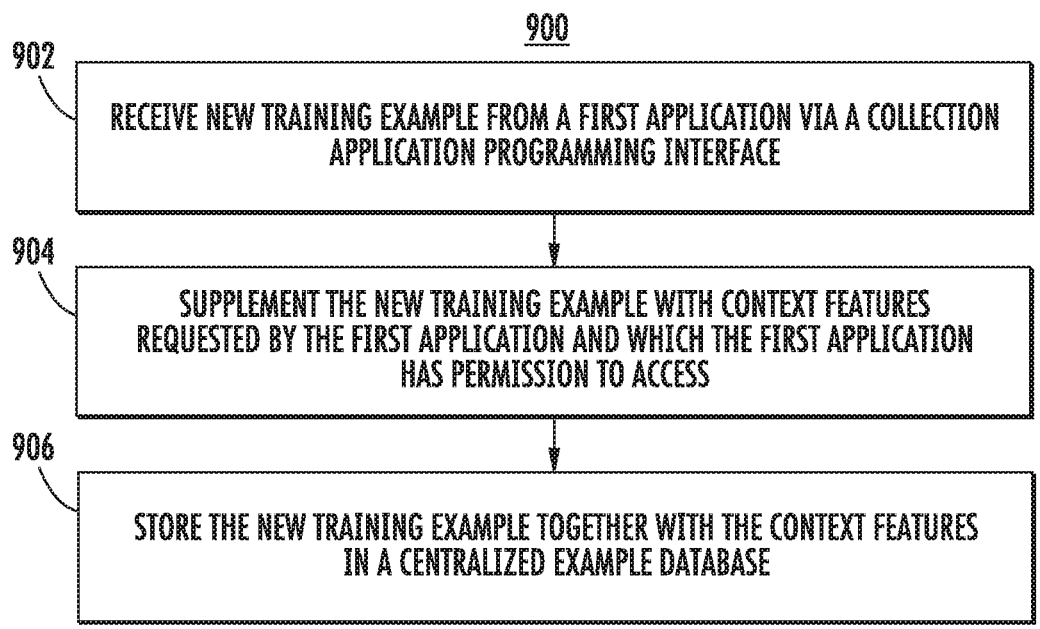
FIG. 9 depicts a flow chart of an example method to collect training examples for performing machine learning according to example embodiments of the present disclosure.

FIG. 9 depicts a flow chart of an example method 900 to collect training examples for performing machine learning according to example embodiments of the present disclosure.

At 902, a computing system can receive a new training example from a first application via a collection application programming interface. At 904, the computing system can supplement the new training example with context features requested by the first application and which the first application has permission to access. In some implementations, at 904, the computing system can determine a permission status for the first application relative to each of one or more context types. In some implementations, the new training example is supplemented only with context features that are included in context types that the first application has permission to access.

At 906, the computing system can store the new training example together with the context features in a centralized example database. In some implementations, storing the new training example at 906 can include storing the new training example in the centralized example database according to one or more options parameters that have been previously defined for the first application via the collection application programming interface. As one example, the one or more options parameters can include at least a time-to-live parameter that defines a period of time for which training examples are stored.

In some implementations, storing the new training example at 906 can include assigning an expiration period to at least a first context feature of the one or more context features. The method 900 can further include deleting the first context feature or the entire new training example from the centralized example database at a conclusion of the expiration period assigned to the first context feature.

In some implementations, method 900 can further include receiving an indication of a change to a permission status for the first application relative to at least one context type; and, in response to the change to the permission status, deleting from the centralized example database any context features of the at least one context type that are associated with training examples associated with the first application. In addition, in some implementations, method 900 can further include after deleting the context features, re-training one or more machine-learned models associated with the first application using the training examples associated with the first application in the centralized example database.

Figure 10:
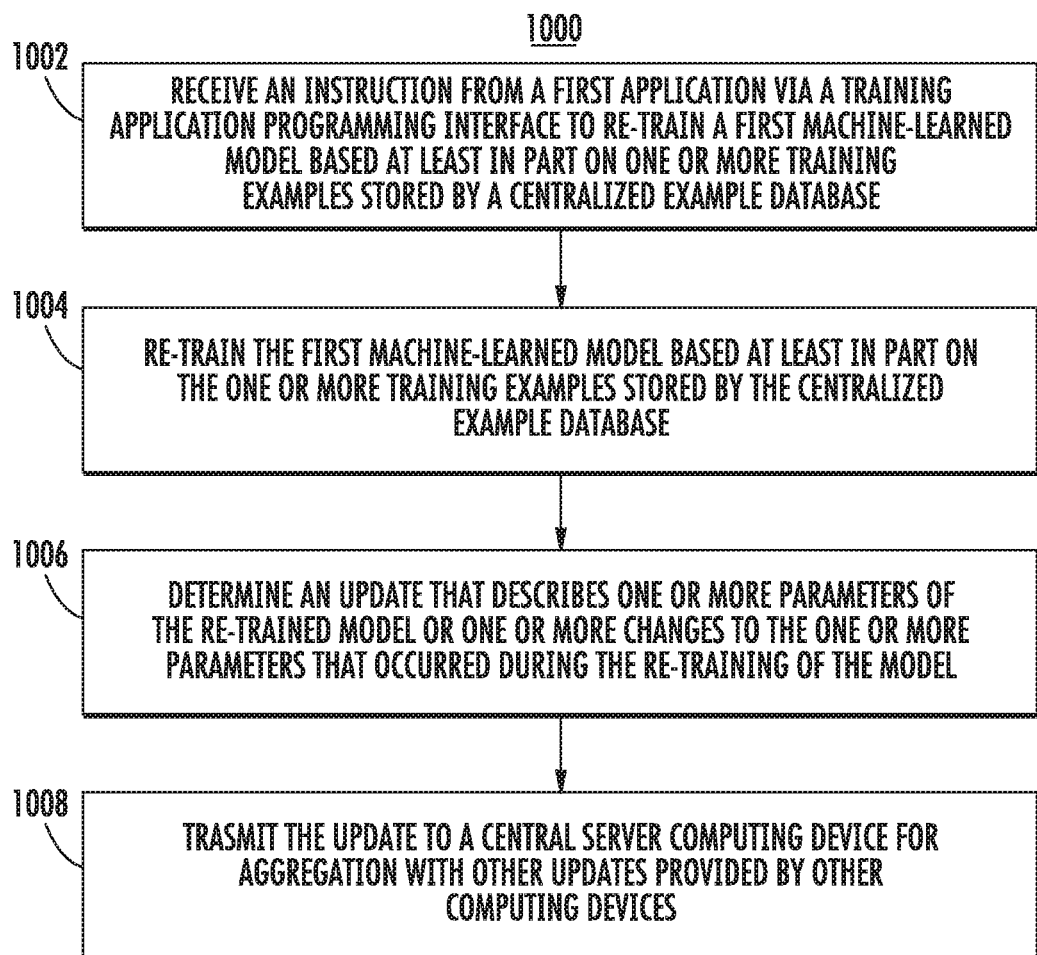
FIG. 10 depicts a flow chart of an example method to train machine-learned models according to example embodiments of the present disclosure.

FIG. 10 depicts a flow chart of an example method 1000 to train machine-learned models according to example embodiments of the present disclosure.

At 1002, a computing system can receive an instruction from a first application via a training application programming interface to re-train a first machine-learned model based at least in part on one or more training examples stored by a centralized example database.

At 1004, the computing system can re-train the first machine-learned model based at least in part on the one or more training examples stored by the centralized example database.

At 1006, the computing system can determine an update that describes one or more parameters of the re-trained model or one or more changes to the one or more parameters that occurred during the re-training of the model.

At 1008, the computing system can transmit the update to a central server computing device for aggregation with other updates provided by other computing devices.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8-10 respectively depict steps performed in a particular order for purposes of illustration and discussion, the methods of the present disclosure are not limited to the particularly illustrated order or arrangement. The various steps of the methods 800, 900, and 1000 can be omitted, rearranged, combined, and/or adapted in various ways without deviating from the scope of the present disclosure.

What is claimed is:

1. A computing device, comprising:
one or more processors; and
one or more non-transitory computer-readable media that store:
  a plurality of applications implemented by the one or more processors;
  one or more machine-learned models operable to provide inferences to the plurality of applications; and
  instructions that, when executed by the one or more processors, cause the computing device to implement an on-device machine learning platform that performs operations, the operations comprising:
    receiving a training plan and model parameters for a first machine-learned model of the one or more machine-learned models from a cloud server, wherein the training plan comprises a graph and instructions, the instructions comprising a declarative description of a sequence of operations to perform on the graph to train the first machine learning model;
    maintaining a plurality of independent enclaves in the on-device machine learning platform;
    receiving a first training example from a first application of the plurality of applications via a collection application programming interface;
    storing the first training example in a first enclave of a centralized example database, wherein the first enclave is not accessible to other non-authenticated applications of the plurality of applications;
    training at least the first machine-learned model of the one or more machine-learned models using the training plan and at least the first training example, wherein training the first machine-learned model comprises selecting, from a plurality of machine learning engines, a machine learning engine associated with the training plan and updating one or more of the model parameters using the selected machine learning engine;
    authenticating a second application of the plurality of applications relative to the first enclave;
    in response to authenticating the second application of the plurality of applications, exposing a prediction application programming interface to the second application;
    receiving input data from the second application of the plurality of applications via the prediction application programming interface;
    employing at least the first machine-learned model of the one or more machine-learned models to generate at least one inference based at least in part on the input data and updated model parameters; and
    providing the at least one inference generated by the first machine-learned model to the second application via the prediction application programming interface.

2. The computing device of claim 1, wherein:
the one or more non-transitory computer-readable media further store the centralized example database that stores training examples received from the plurality of applications; and the operations performed by the on-device machine learning platform further comprise:
receiving a new training example from the first application via the collection application programming interface; and
storing the new training example in the centralized example database.

3. The computing device of claim 2, wherein storing the new training example in the centralized example database comprises storing the new training example in the centralized example database according to one or more options parameters that have been previously defined for the first application via the collection application programming interface, wherein the one or more options parameters comprise at least a time-to-live parameter that defines a period of time for which training examples are stored.

4. The computing device of claim 2, wherein:
the centralized example database stores training examples received from two or more different applications of the plurality of applications.

5. The computing device of claim 2, wherein the operations performed by the on-device machine learning platform further comprise:
receiving an instruction from the first application via a training application programming interface to re-train the first machine-learned model based at least in part on one or more of the training examples stored by the centralized example database; and
in response to the instruction, causing the first machine-learned model to be re-trained based at least in part on one or more of the training examples stored by the centralized example database.

6. The computing device of claim 5, wherein the operations performed by the on-device machine learning platform further comprise:
after causing the first machine-learned model to be re-trained, employing the re-trained first machine-learned model to generate at least one additional inference; and
providing the at least one additional inference generated by the re-trained first machine-learned model to the first application via the prediction application programming interface.

7. The computing device of claim 5, wherein:
the one or more non-transitory computer-readable media further store the selected machine learning engine; and
causing the first machine-learned model to be re-trained based at least in part on one or more of the training examples stored by the centralized example database comprises causing the selected machine learning engine to re-train the first machine-learned model according to the training plan.

8. The computing device of claim 1, wherein:
the instructions that, when executed by the one or more processors, cause the computing device to implement the on-device machine learning platform comprise instructions that, when executed by the one or more processors, cause the computing device to implement an on-device, multi-tenant machine learning platform that performs operations comprising:
maintaining the plurality of independent enclaves respectively for the plurality of applications;
receiving from the first application a signed package token that verifies an identity of the first application;
authenticating the signed package token; and
in response to authentication of the signed package token, providing access to the first enclave of the plurality of independent enclaves, the first enclave associated with the first application.

9. The computing device of claim 1, wherein the instructions that, when executed by the one or more processors, cause the computing device to implement the on-device machine learning platform comprise:
a mobile application; or
a portion of an operating system of the computing device.

10. The computing device of claim 1, wherein the computing device comprises a mobile computing device and the plurality of applications comprise one or more mobile applications.

11. One or more non-transitory computer-readable media that collectively store instructions that, when executed by one or more processors, cause a computing device to implement an on-device machine learning platform that performs operations, the operations comprising:
receiving a training plan and model parameters for a first machine-learned model from a cloud server, wherein the training plan comprises a graph and instructions, the instructions comprising a declarative description of a sequence of operations to perform on the graph to train the first machine learning model;
receiving a first training example from a first application of a plurality of applications via a collection application programming interface;
maintaining a plurality of independent enclaves in the on-device machine learning platform;
storing the first training example in a first enclave of a centralized example database, wherein the first enclave is not accessible to other non-authenticated applications of the plurality of applications;
training at least the first machine-learned model of the one or more machine-learned models using the training plan and at least the first training example, wherein training the first machine-learned model comprises selecting, from a plurality of machine learning engines, a machine learning engine associated with the training plan and updating one or more of the model parameters using the selected machine learning engine;
authenticating a second application of the plurality of applications relative to the first enclave;
in response to authenticating the second application of the plurality of applications, exposing a prediction application programming interface to the second application;
receiving input data from the second application of the plurality of applications stored on the computing device via the prediction application programming interface;
employing at least the first machine-learned model of one or more machine-learned models stored on the computing device to generate at least one inference based at least in part on the input data and updated model parameters; and
providing the at least one inference generated by the first machine-learned model to the second application via the prediction application programming interface.

12. The one or more non-transitory computer-readable media of claim 11, wherein:
the one or more non-transitory computer-readable media further store the centralized example database that stores training examples received from the plurality of applications; and
the operations performed by the on-device machine learning platform further comprise:

receiving a new training example from the first application via the collection application programming interface; and storing the new training example in the centralized example database.

13. The one or more non-transitory computer-readable media of claim 12, wherein storing the new training example in the centralized example database comprises storing the new training example in the centralized example database according to one or more options parameters that have been previously defined for the first application via the collection application programming interface, wherein the one or more options parameters comprise at least a time-to-live parameter that defines a period of time for which training examples are stored.

14. The one or more non-transitory computer-readable media of claim 12, wherein:
the centralized example database stores training examples received from two or more different applications of the plurality of applications.

15. The one or more non-transitory computer-readable media of claim 12, wherein the operations performed by the on-device machine learning platform further comprise:
receiving an instruction from the first application via a training application programming interface to re-train the first machine-learned model based at least in part on one or more of the training examples stored by the centralized example database; and
in response to the instruction, causing the first machine-learned model to be re-trained based at least in part on one or more of the training examples stored by the centralized example database.

16. The one or more non-transitory computer-readable media of claim 15, wherein the operations performed by the on-device machine learning platform further comprise:
after causing the first machine-learned model to be re-trained, employing the re-trained first machine-learned model to generate at least one additional inference; and
providing the at least one additional inference generated by the re-trained first machine-learned model to the first application via the prediction application programming interface.

17. The one or more non-transitory computer-readable media of claim 15, wherein:
the one or more non-transitory computer-readable media further store the selected machine learning engine; and
causing the first machine-learned model to be re-trained based at least in part on one or more of the training examples stored by the centralized example database comprises causing the selected machine learning engine to re-train the first machine-learned model according to the training plan.

18. The one or more non-transitory computer-readable media of claim 11, wherein:
the instructions that, when executed by the one or more processors, cause the computing device to implement the on-device machine learning platform comprise instructions that, when executed by the one or more processors, cause the computing device to implement an on-device, multi-tenant machine learning platform that performs operations comprising:
maintaining the plurality of independent enclaves respectively for the plurality of applications;
receiving from the first application a signed package token that verifies an identity of the first application;
authenticating the signed package token; and
in response to authentication of the signed package token, providing access to the first enclave of the plurality of independent enclaves, the first enclave associated with the first application.

19. The one or more non-transitory computer-readable media of claim 11, wherein the instructions that, when executed by the one or more processors, cause the computing device to implement the on-device machine learning platform comprise:
a mobile application; or
a portion of an operating system of the computing device.

20. A computer-implemented method, the method comprising:
maintaining a plurality of independent enclaves;
receiving a training plan and model parameters for a first machine-learned model from a cloud server, wherein the training plan comprises a graph and instructions, the instructions comprising a declarative description of a sequence of operations to perform on the graph to train the first machine learning model;
receiving, by a computing device via a collection application programming interface, a new training example from a first application of a plurality of applications stored on the computing device;
storing, by the computing device, the new training example in a first enclave of a centralized example database of the computing device, wherein the first enclave is not accessible to other non-authenticated applications of the plurality of applications, receiving, by the computing device, an instruction from the first application via a training application programming interface to re-train the first machine-learned model stored by the computing device based at least in part on one or more of the training examples stored by the centralized example database, the one or more of the training examples comprising the new training example received from the first application;
in response to the instruction, causing, by the computing device, the first machine-learned model to be re-trained based at least in part on the training plan and the one or more of the training examples stored by the centralized example database including the new training example received from the first application, wherein causing the first machine-learned model to be retrained comprises selecting, from a plurality of machine learning engines, a machine learning engine associated with the training plan and updating one or more of the model parameters using the selected machine learning engine;
authenticating a second application of the plurality of applications relative to the first enclave;
in response to authenticating the second application of the plurality of applications, exposing a prediction application programming interface to the second application;
receiving, by the computing device, input data from the second application via the prediction application programming interface;
employing the re-trained first machine-learned model to generate at least one inference based at least in part on the input data; and
providing the at least one inference generated by the first machine-learned model to the second application via the prediction application programming interface.

* * * * *